US012484692B1

(12) United States Patent
Mata

(10) Patent No.: US 12,484,692 B1
(45) Date of Patent: Dec. 2, 2025

(54) BRUSH CLEANING DEVICE

(71) Applicant: Dimas Mata, Seattle, WA (US)

(72) Inventor: Dimas Mata, Seattle, WA (US)

( * ) Notice: Subject to any disclaimer, the term of this patent is extended or adjusted under 35 U.S.C. 154(b) by 0 days.

(21) Appl. No.: 19/208,035

(22) Filed: May 14, 2025

Related U.S. Application Data

(60) Provisional application No. 63/655,831, filed on Jun. 4, 2024.

(51) Int. Cl.
*A46B 17/06* (2006.01)
*B44D 3/00* (2006.01)

(52) U.S. Cl.
CPC .............. *A46B 17/06* (2013.01); *B44D 3/006* (2013.01); *A46B 2200/202* (2013.01)

(58) Field of Classification Search
CPC .......... A46B 17/06; B08B 11/00; B44D 3/006
See application file for complete search history.

(56) References Cited

U.S. PATENT DOCUMENTS 8,938,843 B2 * 1/2015 Junkins .................. B08B 11/00 15/236.08
2016/0374324 A1 * 12/2016 Constantine .............. B25B 9/02 43/53.5

FOREIGN PATENT DOCUMENTS

GB 191329999 A * 5/1914 ............ A45D 24/46

* cited by examiner

*Primary Examiner* — Shay Karls
(74) *Attorney, Agent, or Firm* — Dunlap Bennett & Ludwig, PLLC

(57) ABSTRACT

A brush cleaning device is disclosed. The brush cleaning device has a first arm and a second arm extend along a central axis and that are connected and movable between an open position and a closed position. A first roller is attached to the first arm to be rotatable about a first roller axis, and a second roller is attached to the second arm to be rotatable about a second roller axis, wherein the axis of rotation for each roller is generally perpendicular to the central axis. A closable gap is formed between the first roller and the second roller in the open position, wherein a brush head can be engaged on each side by the two rollers moving to the closed position, whereby the two rollers can then simultaneously smooth the brush head and squeeze of fluid out of the brush head in a controlled manner.

19 Claims, 8 Drawing Sheets

BRUSH CLEANING DEVICE

CROSS REFERENCE TO RELATED APPLICATION

This application claims the benefit of priority of U.S. provisional application No. 63/655,831, filed Jun. 4, 2024, the contents of which are herein incorporated by reference.

BACKGROUND OF THE SUBJECT DISCLOSURE

The subject disclosure relates to brush cleaning devices, and more particularly to a brush cleaning device adapted to squeeze paint, water and solvents from a brush head, while simultaneously smoothing the brush portion of the brush head, be the brush portion bristles, foam or lambskin, without the user needing to touch the brush head.

Cleaning paint from brushes is well known to be a thankless and time-consuming task, yet an important task if the painter plans on ever reusing the brush because failure to properly clean a paintbrush can render the brush portion incapable of facilitating the uniform application of paint. Traditionally, the task involves running water over the bristles and/or the use of solvents that the bristles are submerged into. Both these fluids, which are always needed, will require the user to squeeze the manually water or solvents out of the bristles. In other words, cleaning and squeezing the water or solvents out of a paintbrush historically requires touching the bristles of the brush, which is harmful to the hands if not protected by gloves, and an uncomfortable task. Smoothing a paintbrush is another important part of cleaning a paintbrush that traditionally requires grabbing the head of bristles with one's hands. Again, paints and solvents can harm the hands if rubber or latex gloves are not used in the squeezing and smoothing process.

Prior art solutions exist that use a pair of rows of teeth which bite down on and into the bristles of a paintbrush head that is inserted between the rows of teeth; such forceful separation of the bristles, however, prevents both squeezing the bristles together as a uniform mass and smoothing the bristles of the paintbrush. Moreover, the teeth will tend to tear the bristles of the paintbrush. Furthermore, there are many types of paintbrushes: bristle brushes, touch-up foam brushes, lambskin brushes, and more. Thus, prior art tools that use a row of teeth to penetrate the head of bristles could damage the bristles and almost surely destroy a foam brush. There currently is no tool that is specifically meant for cleaning all types of brushes—bristle brushes, touch up foam brushes, lambskin brushes, etc.—that simultaneously smooths and squeezes the brush portion.

As can be seen, there is a need for a brush cleaning device which can remove paint, water, and solvent from the brush head through squeezing and simultaneously smoothing the brush head without the device penetrating the brush head and without the user having to touch the brush head with their ungloved or gloved hand, where the removal of the paint, water or solvents is done in a controlled manner for the sake of avoiding messes and facilitating a manageable stream of fluid remove so that removed fluid can be urged directly into a container for storing the solvent or water for the next brush to be cleaned.

SUMMARY OF THE SUBJECT DISCLOSURE

The brush cleaning device disclosed herein is dimensioned and adapted to smooth and shape a brush head for all types of brushes, and during the process of squeezing the brush head controllably removing fluid from the brush head so that it can be directly from the brush head into a storage container. The brush cleaning device obviates the need for the user to use their hands to smooth and squeeze the brush portion thereby decreasing the likelihood of harming the brush portion, be it bristles, lambskin or foam.

The subject disclosure cleans and 'dries' the brush portion (through squeezing water/fluid out of the brush head) in a way that is not harmful, only healthy for the brush regardless of brush style. Also, the subject disclosure can be used to clean various types of brushes, including traditional bristles, foam, or lambskin.

The subject disclosure provides two rollers movable between a disengaged position for receiving a brush head therebetween and an engaged position pinching down on the received brush head. As a result of having distally mounted rollers, the subject disclosure may also be used as a brayer roller, art roller, or glue roller, capable of applying pressure to a surface, when the device is in disengaged position.

The subject disclosure has replaceable attachments for different tasks in the brush cleaning process. There is a wire brush attachment, various patterns of comb attachments, and other attachment types. The wire brush attachment may be used to clean the paint on the outside of the brush bristles, while the comb attachment may be used to comb the paint out of the center of the brush while using the tool. The wire brush may also be used for scrubbing dried paint from the ferrule of the brush, foam brush, or the lambskin type of brush.

In accordance with one aspect of the subject disclosure, a brush cleaning device having a pair of opposing rollers adapted to clean a brush head of the brush by sandwiching opposing sides of the brush head so as to squeeze and smooth the brush portion without penetrating the brush head. The brush cleaning device has a handle having a two arms pivotably connected at a first end of each of the two arms so that a second end of each of the two arms is moveable between a closed position and an open position, wherein each second end has a roller rotatably associated thereto about a roller axis, wherein each roller axis is generally perpendicular to a longitudinal axis of the handle; in the closed position the two roller are in an engaged position approximately contacting each other and wherein the open position defines a plurality of disengaged positions of the two rollers relative to each other, wherein a gap between the two rollers is selectively adjustable to receive brush head in the engaged condition, through which the two rollers squeeze opposing sides of the brush head to controllably urge the paint, water, or solvents from the brush head. The gap can be at least three inches or more in the open position or zero inches in the closed position.

In one aspect of the subject disclosure, a brush cleaning device provides the following: a first arm and a second arm operatively associate to be movable about a pivot point between an open position and a closed position; each arm comprising a roller head assembly having: a roller operatively associated thereto, wherein the roller rotates about an axis of rotation extending in a first direction; a connection component extending in the first direction so that an attachment coupled to the connection component provides an operative edge that extends in a second direction away from the roller, wherein the second direction is approximately perpendicular to the first direction; and a proximal end opposite the roller head assembly in a third direction, the third direction being approximately perpendicular to both the first direction and the second direction, wherein the roller continuously squeezes and simultaneously smooths an exterior surface of a brush head during a cleaning process.

In another aspect of the subject disclosure, the brush cleaning device further includes wherein a gap between the rollers of the first and second arms is selectively adjustable, by moving between the open and closed positions, to form an engaged condition between the brush head of a brush occupying the gap and the respective rollers, whereby the engaged condition enables the rollers to rotate about the respective axis of rotation and against opposing sides of the brush head so as to urge fluid from the brush head as the brush head moves in the third direction away from the pivot point.

In yet another aspect of the subject disclosure, the brush cleaning device further includes wherein the attachment comprises a comb mountable to the coupling connection, and wherein the operative edge comprising a series of bristles, wherein the attachment comprises a knife mountable to the coupling connection, and wherein the operative edge comprising a curved edge, wherein the coupling connection provides a series of bristles extending the second direction, wherein the proximal ends of the first and second arms operatively associate with the pivot point, wherein further comprising a spring biasing the first arm and the second arm in the open position; further providing a first stopper on the first arm and a second stopper on the second arm, wherein the first stopper abuts against the second stopper in the open position; and a hook mounted on one of the first arm and the second arm, and a catch mounted on the other of the first arm and the second arm, wherein when the hook engages the catch movement of the first arm away from the second arm is halted.

A still other aspect of the subject disclosure includes method of cleaning a foam brush, the method providing the following: forming an engaged condition between the aforementioned brush cleaning device and a brush head of the foam brush; and urging the brush head in the third direction relative to said brush cleaning device so that fluid carried in the brush head is urged in the third direction through a void defined by a roller and a roller head of said brush cleaning device.

These and other features, aspects and advantages of the present subject disclosure will become better understood with reference to the following drawings, description and claims.

Figure 1:
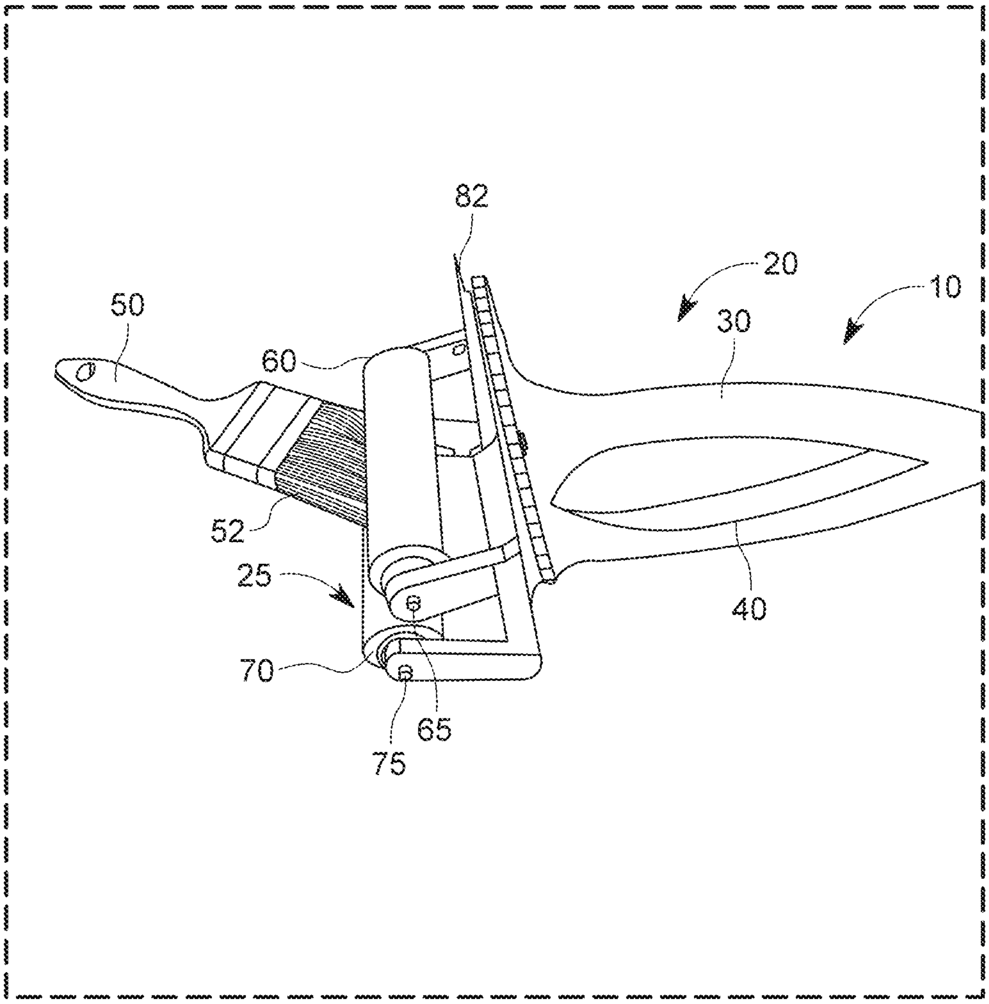
FIG. 1 is a perspective view of an exemplary embodiment of the subject disclosure, shown in a used condition, with the rollers in the engaged position operatively associated with a brush 50.

The appended drawings are not necessarily to scale, presenting a somewhat simplified representation of various features illustrative of the basic principles of the invention. The specific design features of the brush cleaning device as disclosed here, including, for example, any specific dimensions, will be determined in part by the intended application and use environment. Certain features of the illustrated embodiments have been enlarged or distorted relative to others to help provide clear understanding—e.g., thin features may be thickened—for clarity of illustration. All references to direction and position, unless otherwise indicated, refer to the orientation illustrated in the drawings.

DETAILED DESCRIPTION OF THE SUBJECT DISCLOSURE

The following detailed description is of the best currently contemplated modes of carrying out exemplary embodiments of the subject disclosure. The description is not to be taken in a limiting sense but is made merely for the purpose of illustrating the general principles of the subject disclosure, since the scope of the subject disclosure is best defined by the appended claims.

It will be apparent to those skilled in relevant art, that is, to those who have knowledge or experience in this area of technology, that many uses and design variations are possible for the brush cleaning device disclosed here. The following detailed discussion of various alternate elements and embodiments will illustrate the general principles of the subject disclosure with reference to a brush cleaning device especially useful for cleaning handheld paintbrushes without a user getting paint, rinsing water or solvent on the user's hands by way of the controlled engagement afforded by the subject disclosure. Other embodiments suitable for other applications will be apparent to those skilled in relevant art given the benefit of this disclosure.

Turning now to the drawings, FIG. 1 shows a representative example of a brush cleaning device 10 in accordance with one embodiment, having a handle 20 comprising a first arm 30 and a second arm 40. The handle is moveable between an open position to a closed position. The first arm 30 and second arm 40 are connected by a pivot point 55, which may be, but is not limited to, a hinge which can be biased by way of a spring 45 toward the open position.

It is understood that the dimensions and sizes, in and of themselves and relative to associated components, for each component, and the brush cleaning device 100 may vary depending on size and shape of the brush being cleaned, which are innumerable.

The arms 30 and 40 generally extend along or spaced apart in a parallel orientation relative to a central axis 15 (or which is also referred to has a third direction or longitudinal axis) and pivot about a pivot axis 50 (which is also known as a first direction) that is perpendicular to the central axis 15/third direction. When moving, scissor-like, between the open and closed positions, each arm 30 and 40 extends from the proximal end 35, 45 to a respective distal end 33, 43, respectively. The arms 30 and 40 may define an arc (as opposed to being linear) as they extend between their opposing end 35 and 33 and 45 and 43, respectively. The respective proximal ends 35 and 45 are dimensioned and adapted to operatively associate with the pivot point 55 which defines the pivot axis 50 for facilitating the movement between the open and closed positions. At each distal end 33 or 43 is a first roller head 32 and a second roller head 42, respectively.

A first roller 60 operatively associates with the first roller head 32 to be rotatable about a first rotational axis 65 defined by the first roller head 32. A second roller 70 operatively associates with the second roller head 42 to be rotatable about a second rotational axis 75 defined by the first roller head 32. Each roller head 32 and 42 may provide an axle and mounting elements which define the respective rotational axis 65 and 75. Each rotational axis 65 and 75 is generally perpendicular to the central axis 15/the third direction defined by the handle 20.

Figure 7:
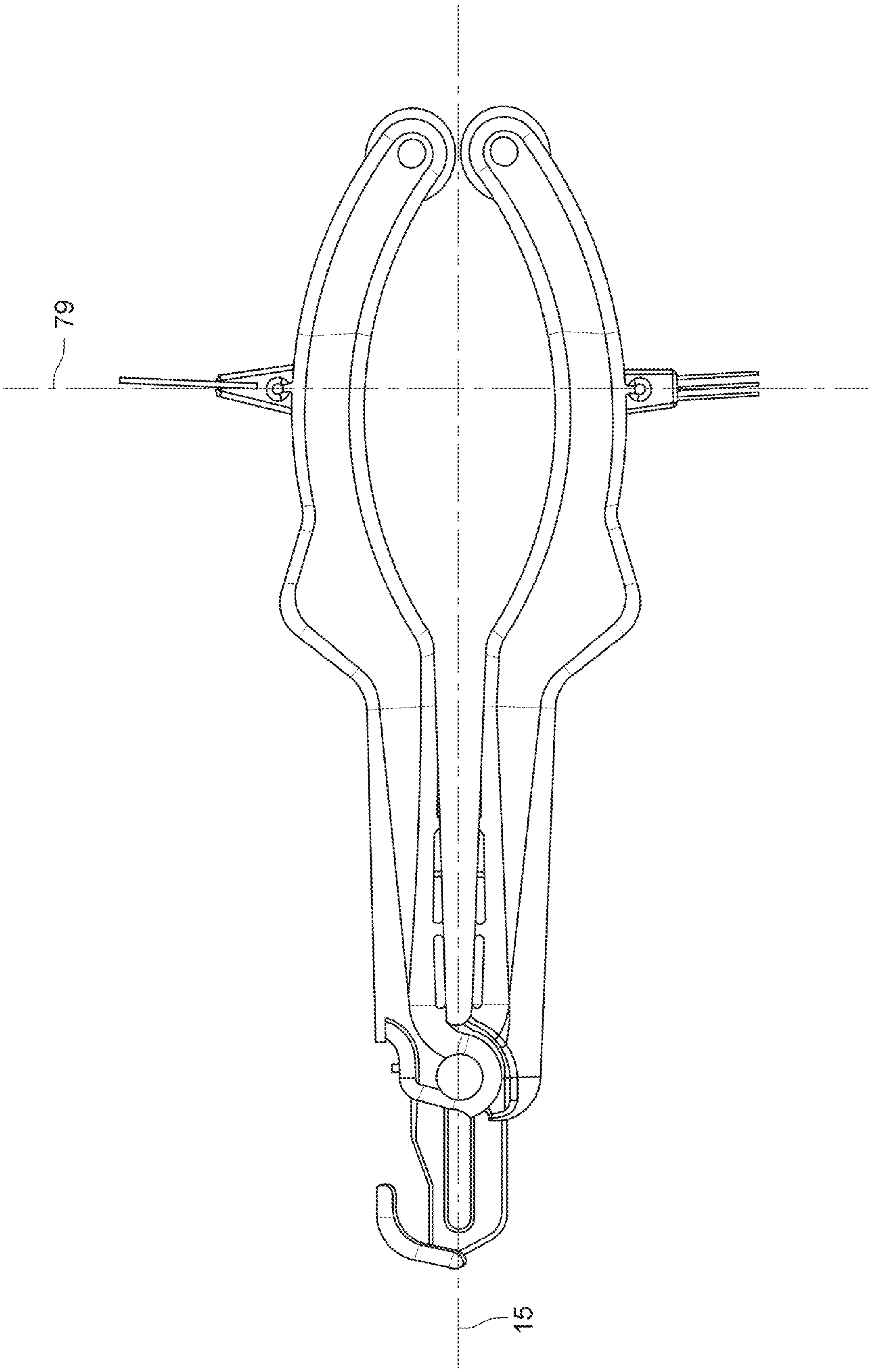
FIG. 7 shows an elevation of an exemplary embodiment of the subject disclosure, illustrating the closed position.
Figure 8:
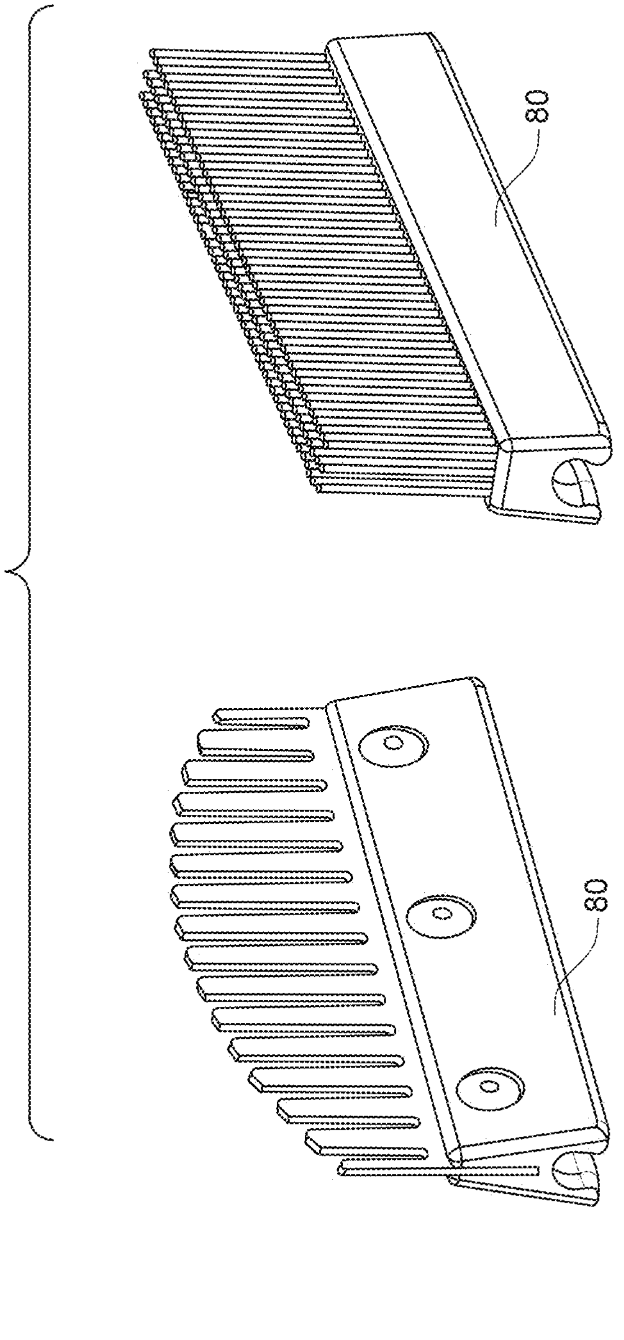
FIG. 8 shows exemplary embodiments of removable attachments 80 of the subject disclosure.

As the handle 20 moves to the closed position, the first roller 30 and the second roller 40 are urged closed together. A selectively adjustable gap 25 persists between the first and second rollers 60 and 70 when the handle 20 moves between the open and closed positions, and, in some embodiments, the gap is eliminated in the closed position of the handle 20, as shown in FIG. 7. The gap 25 is adapted to receive a brush head 52 of a brush 50 and engage the opposing sides of the brush head 52 in an engaged condition. The engaged condition is defined by opposing rollers 60 and 70 sandwiching opposing sides brush head 52 whereby the rollers 60 and 70 are rotatable about their respective rotational axis in this engaged condition, thereby urging paint, water, or solvents from the brush head 52 in the third direction.

At least one of the roller heads 32 or 42 provides for the removably attachment of a comb attachment 80 for additional cleaning, as needed.

In operation a user can hold the brush 50 to be cleaned in one hand, insert the brush head 52 of the brush 50 into the gap 25 between the rollers 60, 70, and urges the two arms 30 and 40 together toward the closed position until the engaged condition is formed.

While urging the brush 50 in the third direction, away from the pivot point 55, the rollers 60 and 70 rotate and allow for the non-destructive removal of paint (and other fluids, such as washing water or solvents) from the brush 50. Significantly, the brush cleaning device 100 disclosed herein allows for removal of fluids and debris from the engaged brush head 52 without the user getting paint or other cleaning fluids on themselves since the rollers 60 and 70, once urged against opposing sides of the brush head 52, can ride along said engaged brush head 52 linearly, in the third direction, so that the paint and other fluids in the brush head 52 are intentionally directed in a controlled manner in that linear direction. This way, the fluid urged out of the brush head 52 can be directed into a storage container (not shown). There is a void between each roller 60 and 70 and their respective roller heads 32 and 42 so that the fluid is urged through one of those voids and into a sink or the storage container. It is understood that the user could also keep the brush 50 fixed, and roll the rollers 60 and 70 in the engaged condition along the brush head 52 to generation similar results where the engaged condition starts at a proximal end of the brush head and ends at the distal end of the brush head 52, thereby simultaneously smooth the bristles, foam or lambskin of that brush head 52. Additionally, the rolling movement of the rollers 60 and 70 decreases the likelihood of pulling out bristles or tearing foam or lambskin, as opposed to what one would expect from a pinching squeegee bladed configuration found in the prior art.

It is to be understood that by brush head 52, the subject disclosure includes paintbrushes with a head of bristles, a foam head, a lambskin head or other kinds of brush head 52, even though FIG. 1 shows a head of bristles. Additionally, the term 'brush' 50 is understood to include brushes that may be used in applying stains, glue, or other viscous substance, that do not add paint per se, not just a paintbrush.

Figure 2:
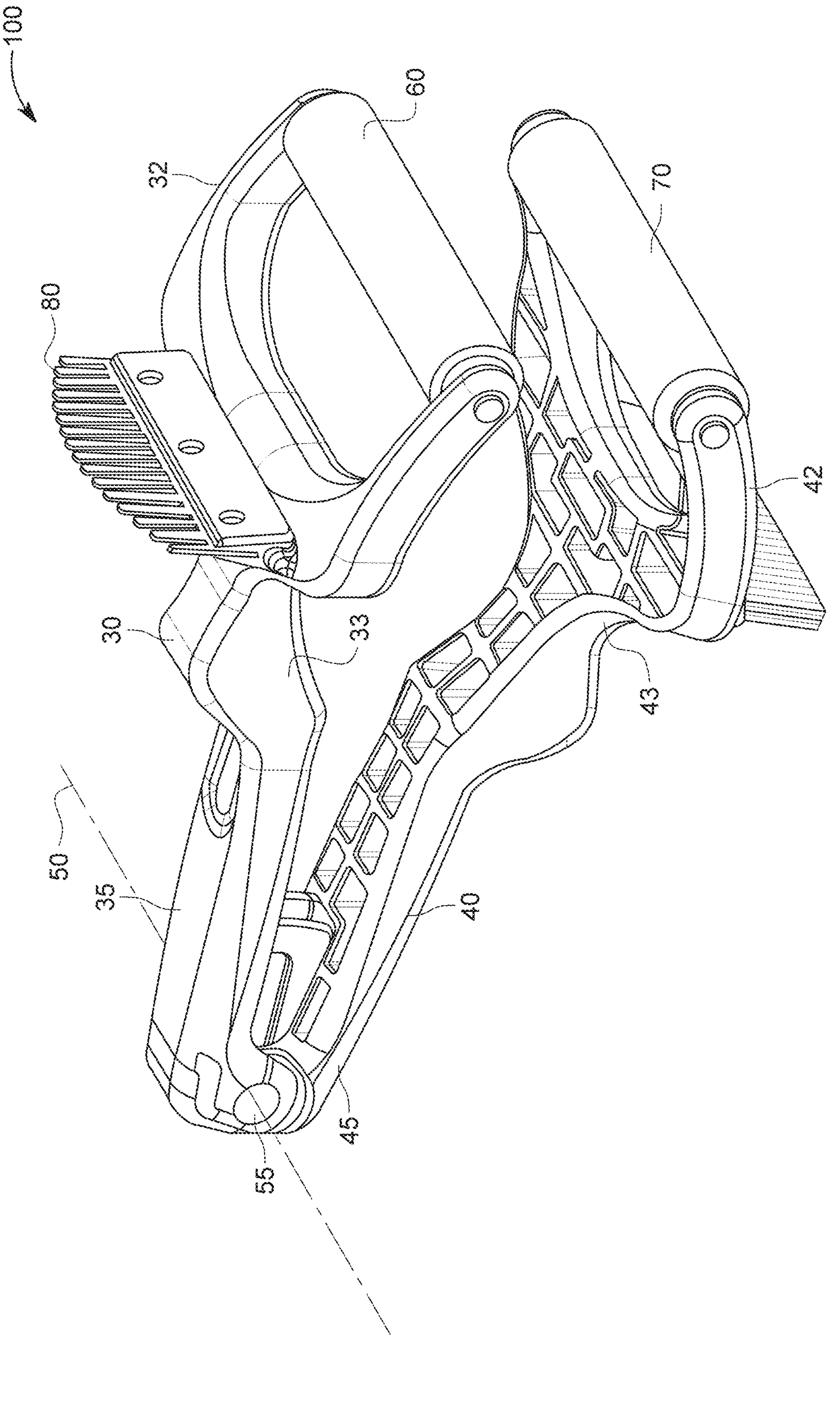
FIG. 2 is a perspective view of an exemplary embodiment of the subject disclosure.
Figure 3:
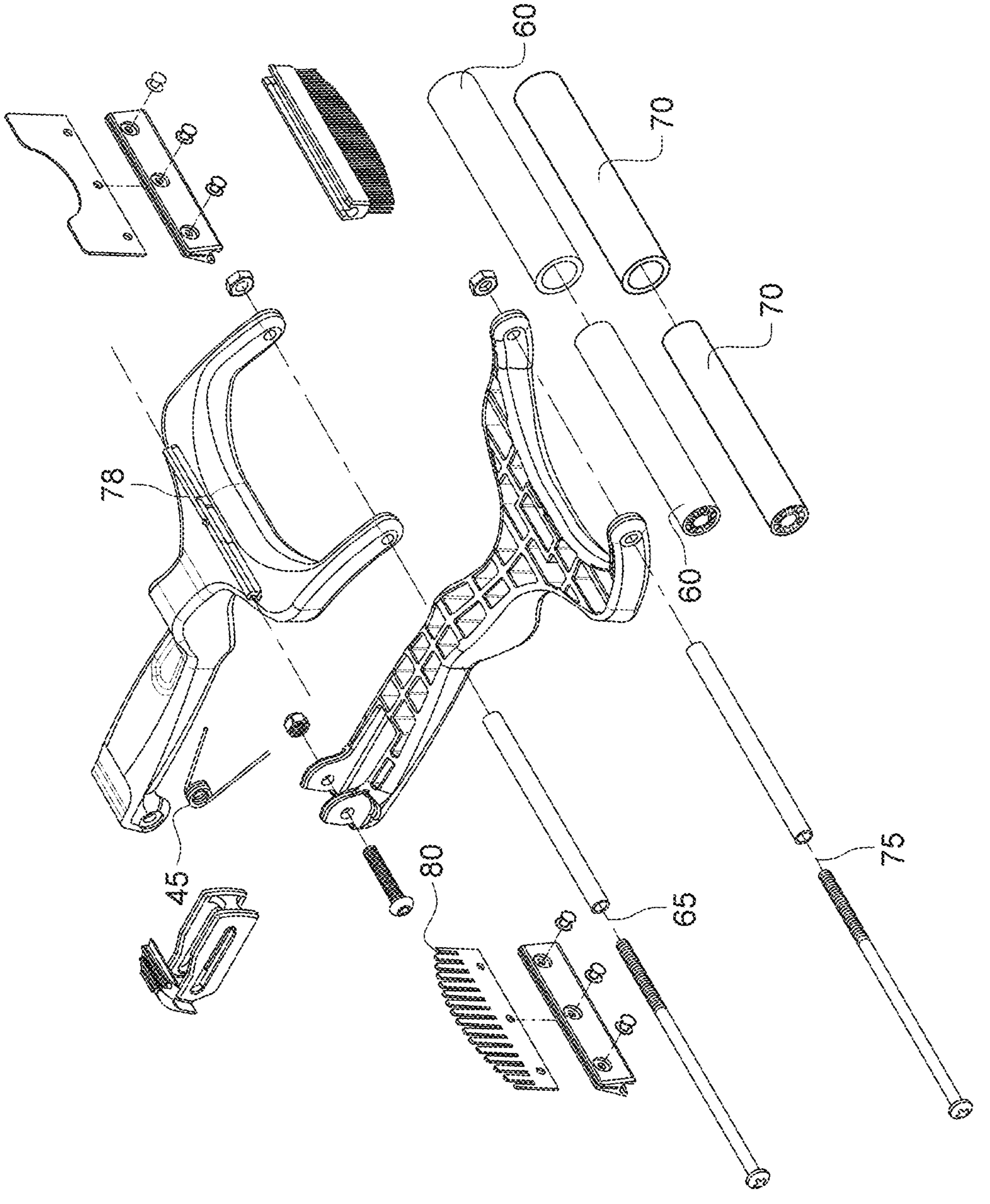
FIG. 3 is an exploded perspective view of a roller of an exemplary embodiment of the subject disclosure.

FIG. 2 shows another view of the brush cleaning device 100 with an attachment 80 mounted on the first roller head 32. A connection component may be provided along both roller heads 32 and 42 to enable a removably connection between the attachment element 78, see FIG. 3, and an associated roller head 32 or 42. The connection component is disposed proximal the adjacent roller, wherein the connection component extends in the first direction, or generally parallel thereto, along the respective holler head 32 or 42 so that the attachment element 78 extends is a second direction 79, see FIG. 7, the second direction being approximately perpendicular to the aforementioned first and third directions. This second direction extension is important as it incorporates an operative distal edge of the attachment element 78 projecting in that second direction away from the gap 25, because the second-direction orientation allows application of the mounting attachment element 78 by way of twist of the wrist of the user. Accordingly, the user may apply the cleaning action of the rollers in the third direction and then move the rollers to a disengaged condition and rotate their wrist/arm 180-degrees and apply the operative distal edge of the attachment element 78.

The attachment element 78 may be a comb 80 provided with a series of teeth—whose distal edges are the operative distal edge-used for pulling through the head of bristles 52 to help remove paint or other large items. The teeth extend generally orthogonally away from the adjacent roller axis of rotation (here 65) and pivot axis 55 and generally perpendicular to the central axis 15, wherein the comb 80 extends away from the gap 25 between the first and second rollers 60 and 70. Alternatively, or in combination, the comb 80 may be formed with a series of bristles to help clean the ferrule of a paintbrush.

Any combination of teeth and bristles may be used on one or both sides of the handle 10. For example, a comb 80 may be formed on or be integral with the first roller head 32 which has teeth, and another comb with bristles may be formed on the second roller head 42 for paint and dirt removal from the non-bristled components of the brush 50.

Each roller is allowed to freely rotate on its independent axle's axis. The axle is connected, in some embodiments, to a mounting flange, and the mounting flange is operatively connected to one of the arms.

Figure 4:
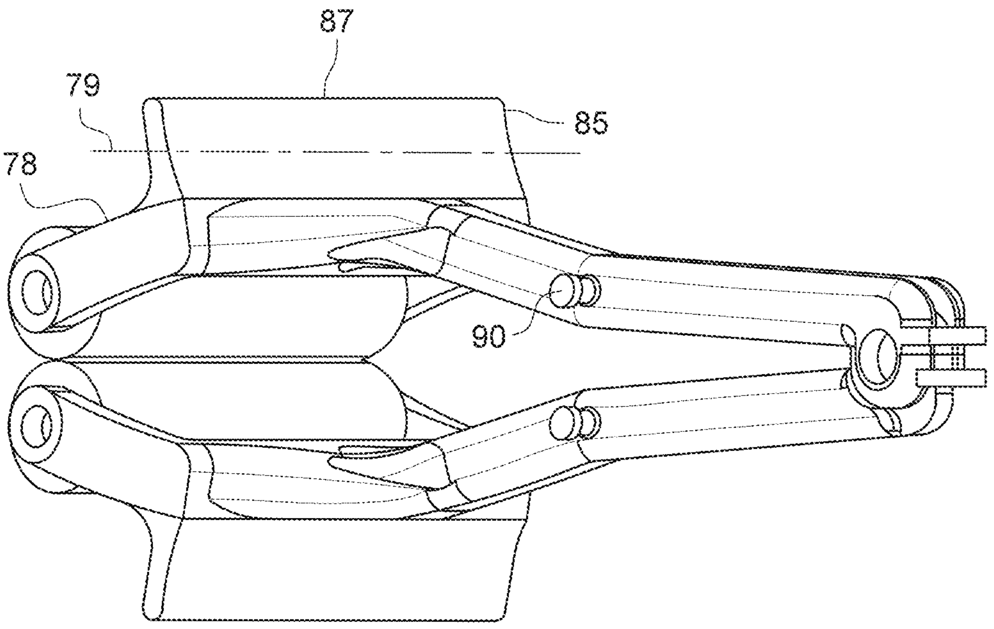
FIG. 4 is a rear perspective view of an exemplary embodiment of the subject disclosure, illustrating a curved scraping edge 87.
Figure 5:
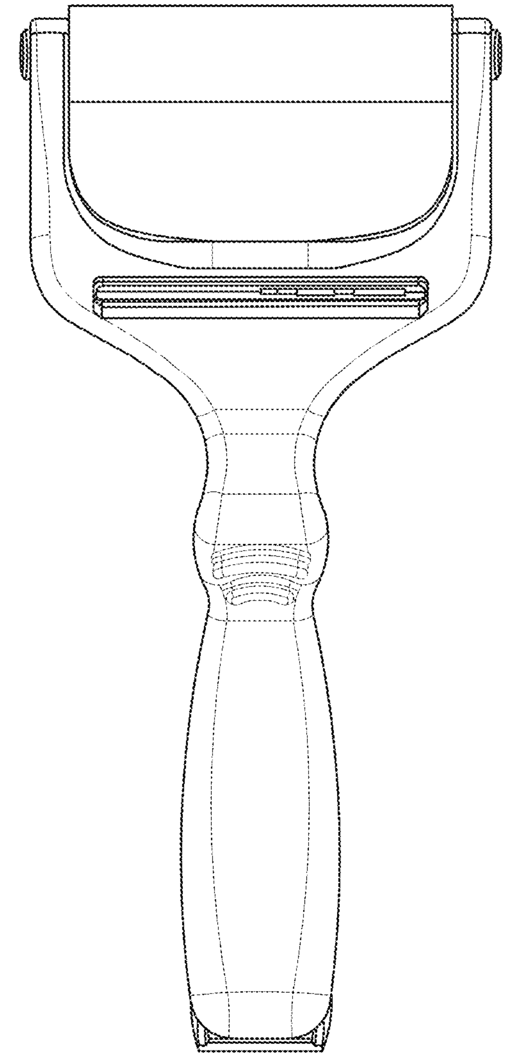
FIG. 5 is a plan view of an exemplary embodiment of the subject disclosure.
Figure 6:
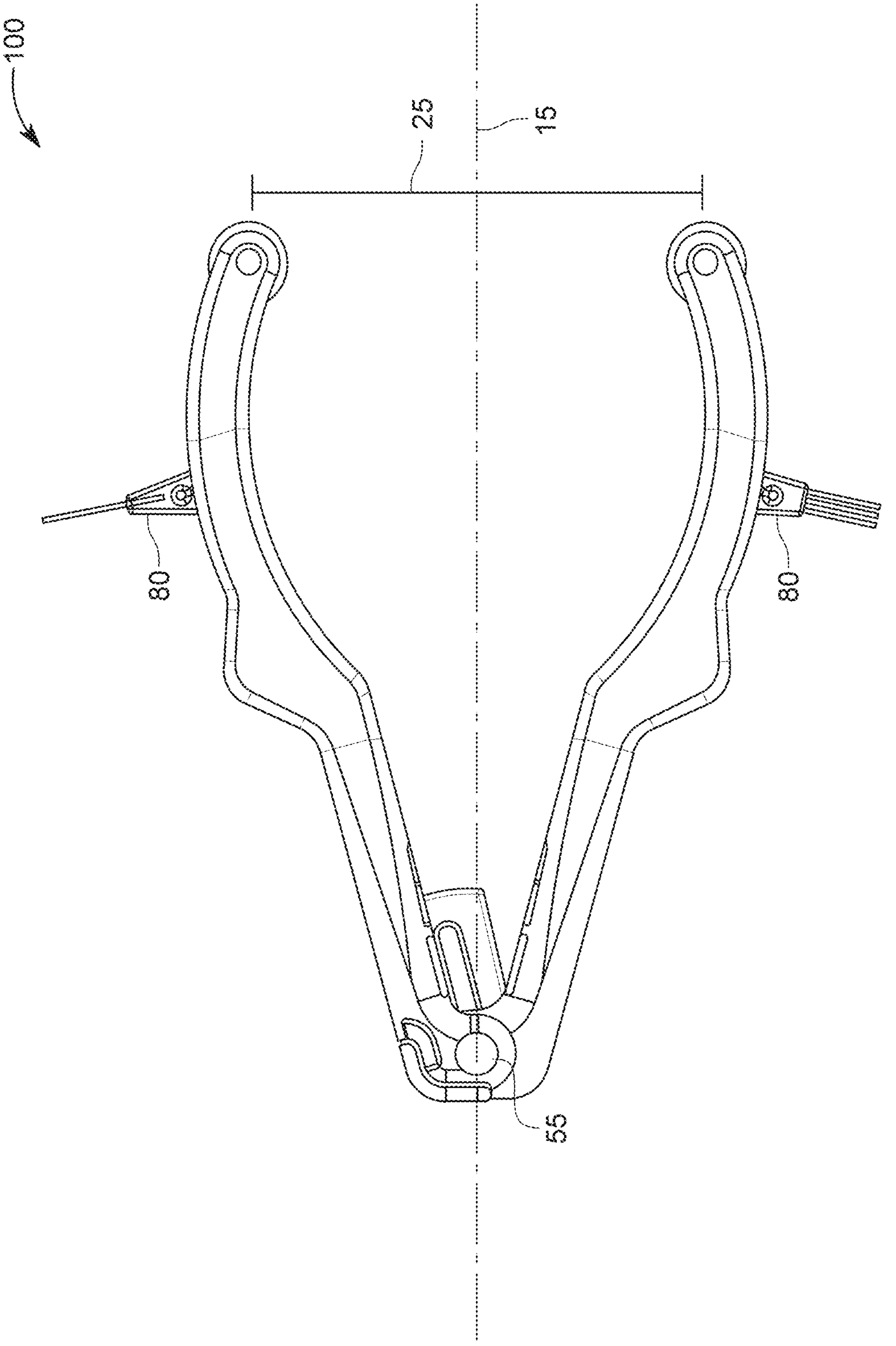
FIG. 6 is a side elevation view of an exemplary embodiment of arms of the subject disclosure, shown in an open/disengaged position.

FIG. 4 shows another embodiment of the brush cleaning device 100 with and integrated (or removably, in some embodiments) scraping element 85. The scraping element 85 may have a scraping edge 87 wherein the scraping edge 87 is the operative distal edge to help remove dirt or debris. As shown, the scraping edge 87 may extend in the second direction 79, just like an attachment element 78, and face the longitudinal central axis 15 as it curves backward by at least fifteen degrees of radius. Also shown is a catch projection 90 on each arm for urging the arms in the closed position or toward the closed position by way of an elastic band, which may facilitate storage and stowing of the subject disclosure.

A spring 45 may be positioned between the first arm to bias the handle toward the open position, such that force from a user is needed to move the arms back toward the closed position and engage the paintbrush 50 for cleaning. A catch/hook may also be provided on each arm to releasably resist movement of the respective arm away from the closed position. FIG. 1 shows the brush cleaning device 100 where an intrinsic series of bristles 82 extends in the second direction and is provided along a roller head 32/42 along the coupling component so that the bristles extend in the second direction.

From the foregoing disclosure and detailed description of certain embodiments, it will be apparent that various modifications, additions and other alternative embodiments are possible without departing from the true scope of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the subject disclosure and that modifications may be made without departing from the spirit and scope of the subject disclosure as set forth in the following claims.

What is claimed is:

1. A brush cleaning device comprising:

a first arm and a second arm are operatively associate to be movable about a pivot point between an open position and a closed position;

each arm comprising a roller head assembly having:

a roller operatively associated thereto, wherein the roller rotates about an axis of rotation extending in a first direction;

a connection component extending in the first direction so that an attachment coupled to the connection component provides an operative edge that extends in a second direction away from the roller, wherein the second direction is approximately perpendicular to the first direction; and a proximal end opposite the roller head assembly in a third direction, the third direction being approximately perpendicular to both the first direction and the second direction, wherein the roller continuously squeezes and simultaneously smooths an exterior surface of a brush head during a cleaning process, wherein a gap between the rollers of the first and second arms is selectively adjustable, by moving between the open and closed positions, to form an engaged condition between the brush head of a brush occupying the gap and the respective rollers, whereby the engaged condition enables the rollers to rotate about the respective axis of rotation and against opposing sides of the brush head so as to urge fluid from the brush head as the brush head moves in the third direction away from the pivot point, wherein the attachment comprises a comb mountable to the coupling connection, and wherein the operative edge comprising a series of bristles.

2. The brush cleaning device of claim 1, wherein the attachment comprises a knife mountable to the coupling connection, and wherein the operative edge comprising a curved edge.

3. The brush cleaning device of claim 1, wherein the coupling connection provides a series of bristles extending the second direction.

4. The brush cleaning device of claim 1, wherein the proximal ends of the first and second arms operatively associate with the pivot point.

5. The brush cleaning device of claim 4, wherein further comprising a spring biasing the first arm and the second arm in the open position.

6. The brush cleaning device of claim 5, further comprising a first stopper on the first arm and a second stopper on the second arm, wherein the first stopper abuts against the second stopper in the open position.

7. The brush cleaning device of claim 6, further comprising a hook mounted on one of the first arm and the second arm, and a catch mounted on the other of the first arm and the second arm, wherein when the hook engages the catch movement of the first arm away from the second arm is halted.

8. A method of cleaning a foam brush, the method comprising:

forming an engaged condition between a brush cleaning device of claim 1 and a brush head of the foam brush; and urging the brush head in the third direction relative to said brush cleaning device so that fluid carried in the brush head is urged in the third direction through a void defined by a roller and a roller head of said brush cleaning device.

9. A brush cleaning device comprising:

a first arm and a second arm are operatively associate to be movable about a pivot point between an open position and a closed position;

each arm comprising a roller head assembly having:

a roller operatively associated thereto, wherein the roller rotates about an axis of rotation extending in a first direction;

a connection component extending in the first direction so that an attachment coupled to the connection component provides an operative edge that extends in a second direction away from the roller, wherein the second direction is approximately perpendicular to the first direction; and a proximal end opposite the roller head assembly in a third direction, the third direction being approximately perpendicular to both the first direction and the second direction, wherein the roller continuously squeezes and simultaneously smooths an exterior surface of a brush head during a cleaning process, wherein a gap between the rollers of the first and second arms is selectively adjustable, by moving between the open and closed positions, to form an engaged condition between the brush head of a brush occupying the gap and the respective rollers, whereby the engaged condition enables the rollers to rotate about the respective axis of rotation and against opposing sides of the brush head so as to urge fluid from the brush head as the brush head moves in the third direction away from the pivot point, wherein the attachment comprises a knife mountable to the coupling connection, and wherein the operative edge comprising a curved edge.

10. The brush cleaning device of claim 9, wherein the coupling connection provides a series of bristles extending the second direction.

11. The brush cleaning device of claim 9, wherein the proximal ends of the first and second arms operatively associate with the pivot point.

12. The brush cleaning device of claim 11, wherein further comprising a spring biasing the first arm and the second arm in the open position.

13. The brush cleaning device of claim 12, further comprising a first stopper on the first arm and a second stopper on the second arm, wherein the first stopper abuts against the second stopper in the open position.

14. The brush cleaning device of claim 13, further comprising a hook mounted on one of the first arm and the second arm, and a catch mounted on the other of the first arm and the second arm, wherein when the hook engages the catch movement of the first arm away from the second arm is halted.

15. A brush cleaning device comprising:

a first arm and a second arm are operatively associate to be movable about a pivot point between an open position and a closed position;

each arm comprising a roller head assembly having:

a roller operatively associated thereto, wherein the roller rotates about an axis of rotation extending in a first direction;

a connection component extending in the first direction so that an attachment coupled to the connection component provides an operative edge that extends in a second direction away from the roller, wherein the second direction is approximately perpendicular to the first direction; and a proximal end opposite the roller head assembly in a third direction, the third direction being approximately perpendicular to both the first direction and the second direction, wherein the roller continuously squeezes and simultaneously smooths an exterior surface of a brush head during a cleaning process, wherein a gap between the rollers of the first and second arms is selectively adjustable, by moving between the open and closed positions, to form an engaged condition between the brush head of a brush occupying the gap and the respective rollers, whereby the engaged condition enables the rollers to rotate about the respective axis of rotation and against opposing sides of the brush head so as to urge fluid from the brush head as the brush head moves in the third direction away from the pivot point, wherein the coupling connection provides a series of bristles extending the second direction.

16. The brush cleaning device of claim 15, wherein the proximal ends of the first and second arms operatively associate with the pivot point.

17. The brush cleaning device of claim 16, wherein further comprising a spring biasing the first arm and the second arm in the open position.

18. The brush cleaning device of claim 17, further comprising a first stopper on the first arm and a second stopper on the second arm, wherein the first stopper abuts against the second stopper in the open position.

19. The brush cleaning device of claim 18, further comprising a hook mounted on one of the first arm and the second arm, and a catch mounted on the other of the first arm and the second arm, wherein when the hook engages the catch movement of the first arm away from the second arm is halted.

* * * * *